April 26, 1949.　　　　M. B. SAMPLE　　　　2,468,639
POTATO DIGGER AND SACKER

Filed Sept. 20, 1945　　　　　　　　　　8 Sheets-Sheet 1

MILTON B. SAMPLE
Inventor

By Paul Laba
Attorney

April 26, 1949.   M. B. SAMPLE   2,468,639
POTATO DIGGER AND SACKER
Filed Sept. 20, 1945   8 Sheets-Sheet 3

Inventor:
MILTON B. SAMPLE
By
Paul S. Eaton
Attorney

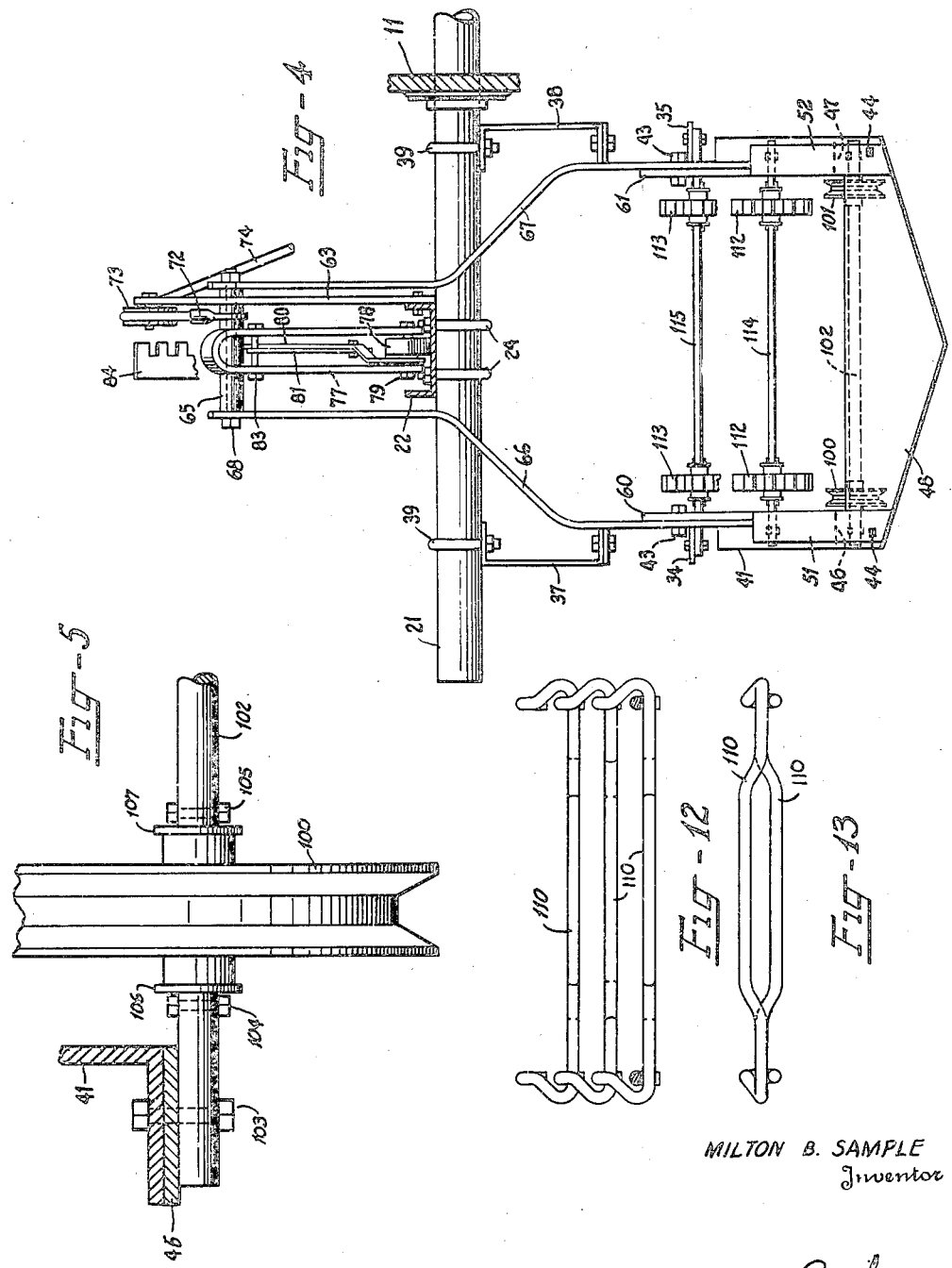

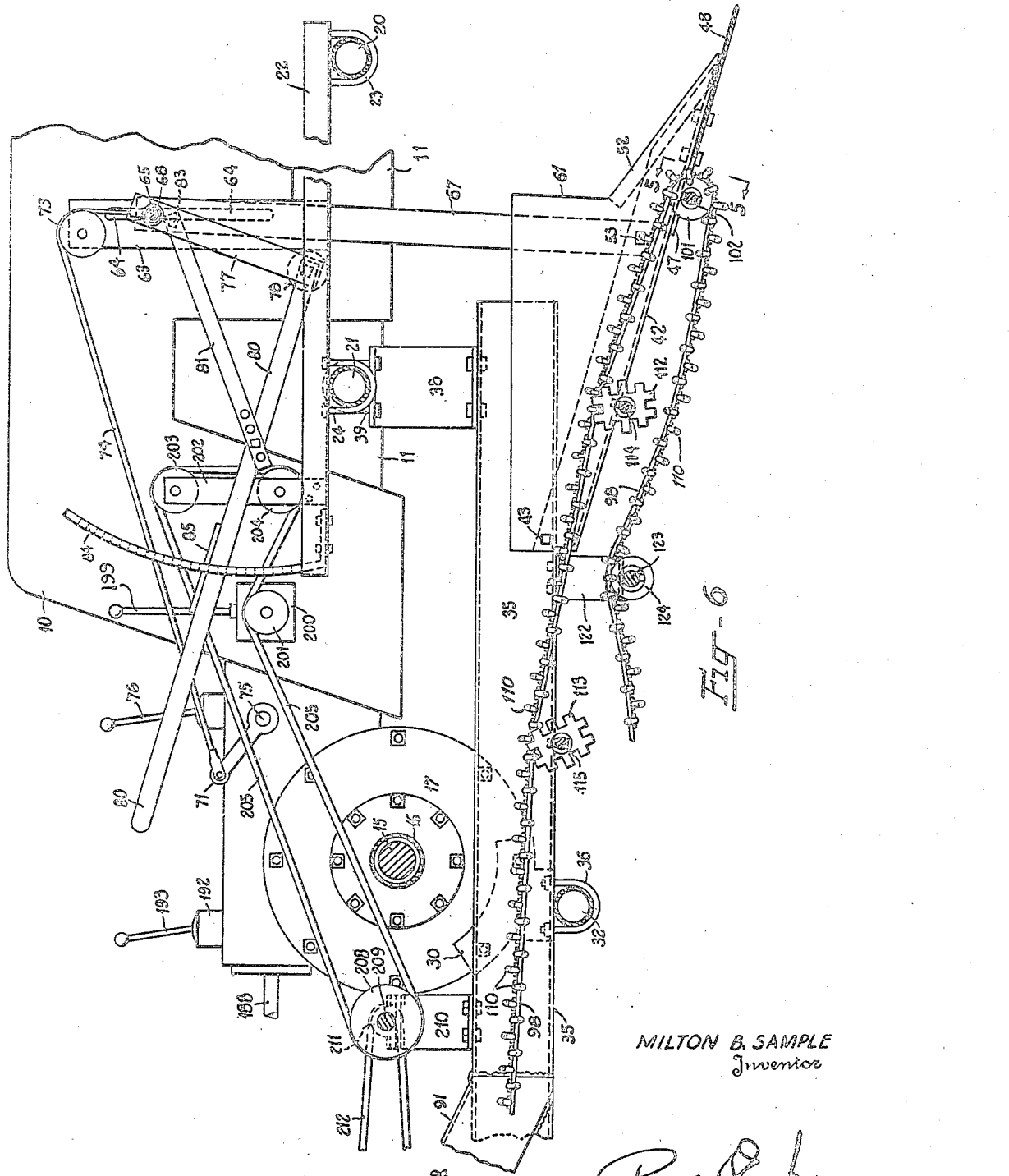

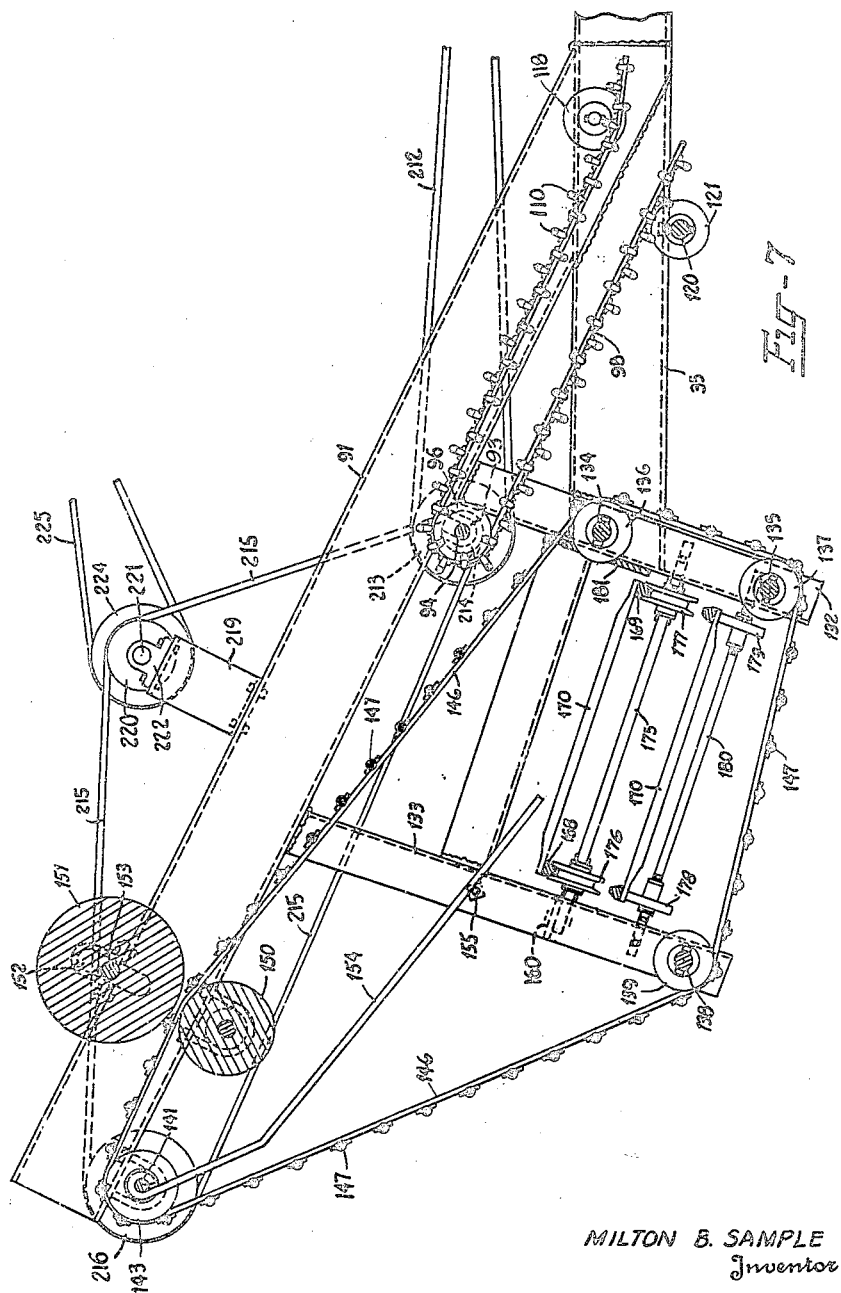

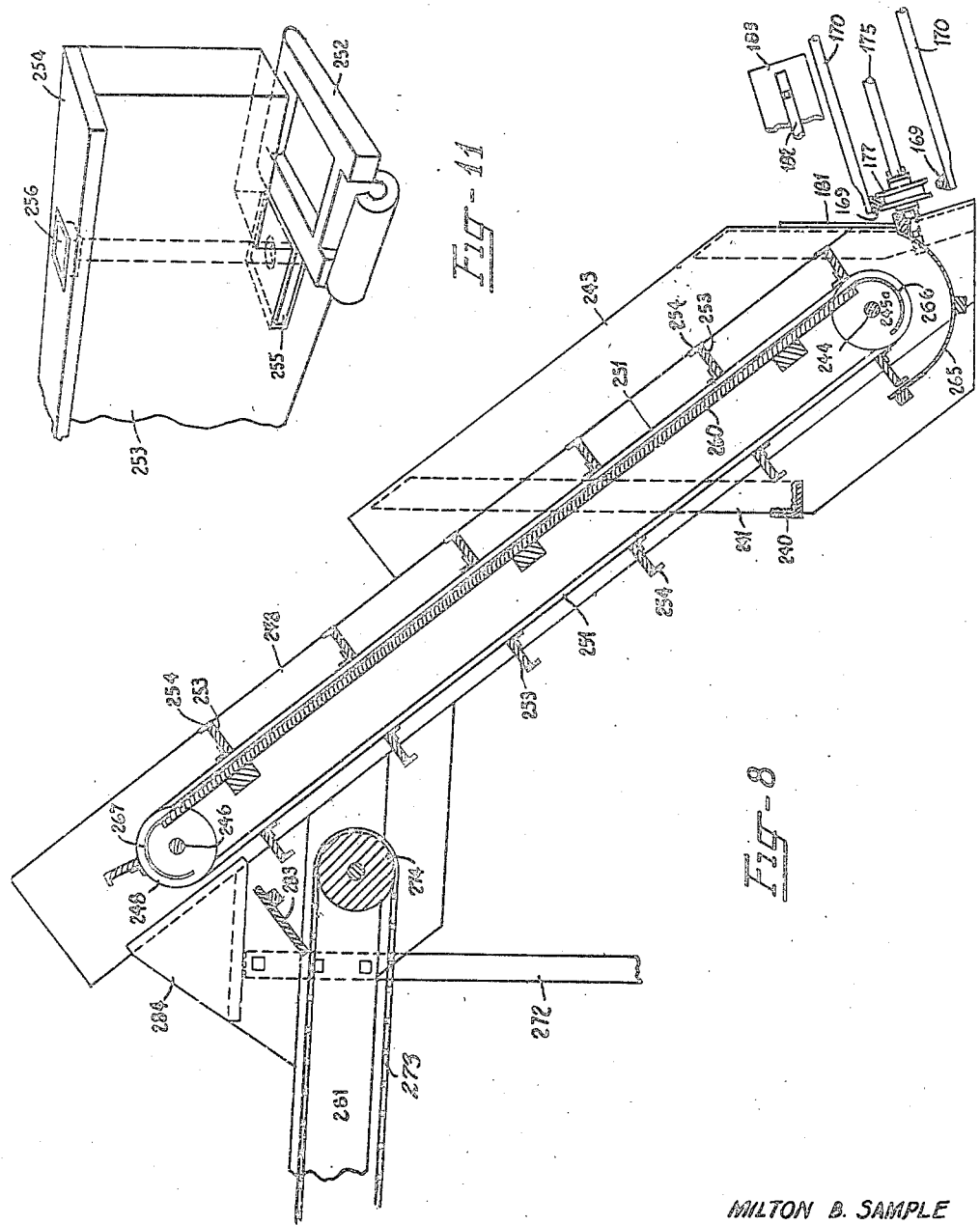

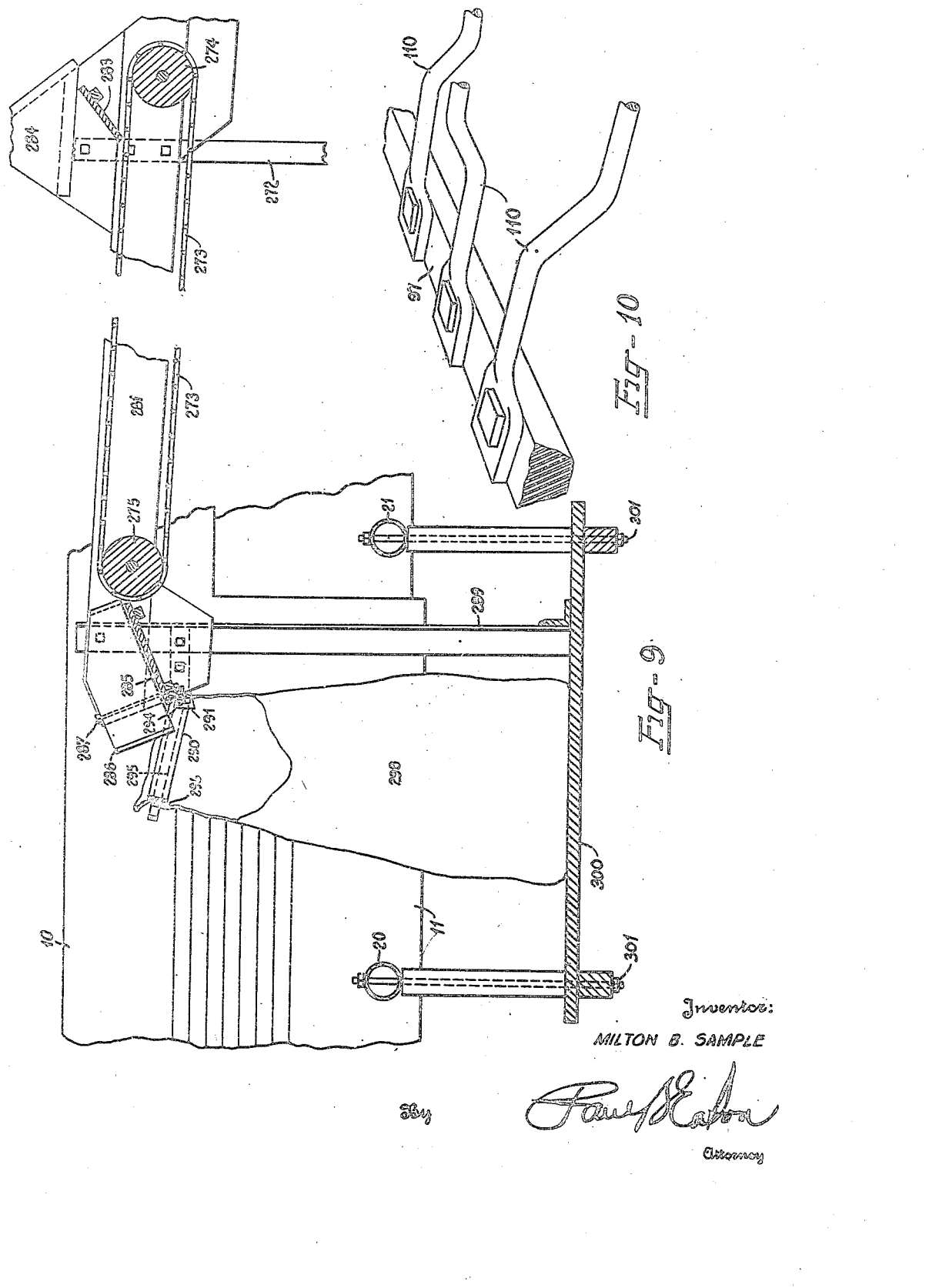

Patented Apr. 26, 1949

2,468,639

UNITED STATES PATENT OFFICE 2,468,639

POTATO DIGGER AND SACKER

Milton B. Sample, Elizabeth City, N. C.

Application September 20, 1945, Serial No. 617,505

13 Claims. (Cl. 55—51)

This invention relates to a potato digger and sacker and more especially to a tractor having mounted on one side thereof a suitable digging and conveying apparatus which separates the earth from the potatoes after digging the same out of the ground and conveys the potatoes rearwardly where they fall through a second conveyor which separates the tops from the potatoes.

The second conveyor passes between a pair of rollers which squeeze any remaining potatoes from the tops while the tops are discharged out of the rear of the machine while the potatoes fall downwardly onto a transverse third conveyor which conveys the potatoes across to the other side and rearwardly of the tractor.

The third or transverse conveyor is tilted forwardly so that the potatoes will roll forwardly towards the forward edge of the transverse conveyor and just before they reach the end of the conveyor will fall into an elevating or fourth conveyor where they will be elevated and dropped onto a fifth conveyor which will convey them to a suitable sacking mechanism where they will be dumped into suitable sacks disposed on a suitable platform carried by the tractor.

It is an object of this invention to provide a tractor equipped with a potato digging apparatus which will dig the potatoes and separate the earth from the potatoes together with means for separating the tops from the potatoes and removing from the tops any remaining potatoes adhering thereto and transferring the potatoes laterally and behind the tractor and into an elevating conveyor where they are elevated and deposited into suitable containers or bags carried by a suitable platform on the tractor.

It is another object of this invention to provide a potato digger and sacker adapted to be carried by a tractor which will dig the potatoes, separate the earth and other foreign matter from the potatoes, and sack the potatoes while the tractor is traveling across the field.

This application is a continuation in part of my co-pending patent application for a Potato digger and sacker, Serial No. 605,368, filed July 16, 1945, which became abandoned July 7, 1947.

Some of the objects of the invention having been stated, other objects will appear as the description proceeds when taken in connection with the accompanying drawings in which:

Figure 4 is a front elevation taken substantially along the line 4—4 in Figure 1;

Figure 5 is an enlarged sectional detail view taken along the line 5—5 in Figure 6 and showing means for mounting the pulleys on which the conveyors are mounted, said structure being common to the first, second, and third conveyors hereinafter to be described;

Figure 6 is a vertical sectional view on an enlarged scale and taken substantially along the line 6—6 in Figure 3;

Figure 7 is a view on an enlarged scale and taken substantially along the line 7—7 in Figure 3;

Figure 8 is a vertical sectional view on an enlarged scale and taken substantially along the line 8—8 in Figure 3;

Figure 9 is a longitudinal sectional view taken substantially along the line 9—9 in Figure 3 and omitting the upper front portion of the elevating conveyor;

Figure 10 is an isometric view showing the manner in which the bars are mounted on the belt to make the conveyors, such as the first, second, and third conveyors;

Figure 11 is an isometric view showing another form of conveyor adapted to be used in the mechanism shown in Figure 8, that is, the elevating conveyor;

Figure 12 is a plan view of a type of the conventional conveyor chain which may be used to good advantage in the first, second, and third conveyors in the apparatus herein described;

Figure 13 is an edge view of the type of conveyor chains shown in Figure 12.

Figure 1:
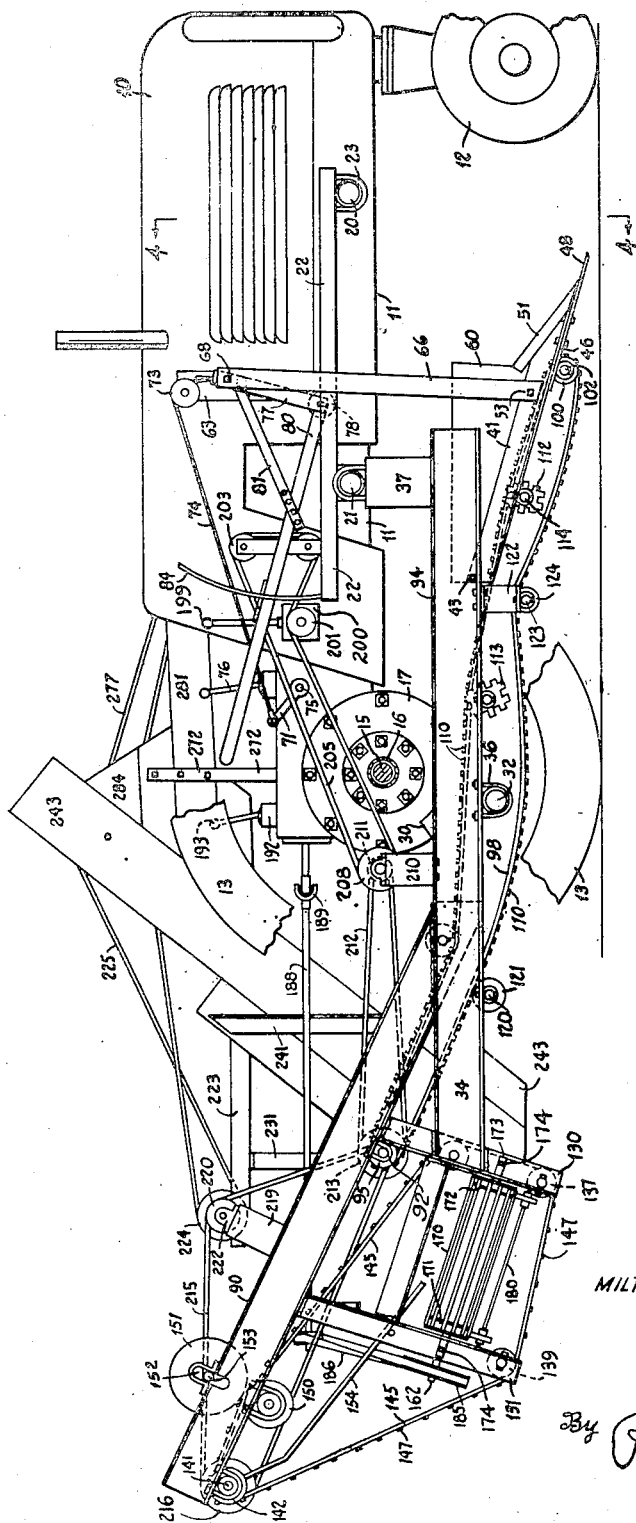
Figure 1 is a side elevation of a tractor equipped with my approved apparatus and showing a large portion of the rear wheel of the tractor broken away.
Figure 2:
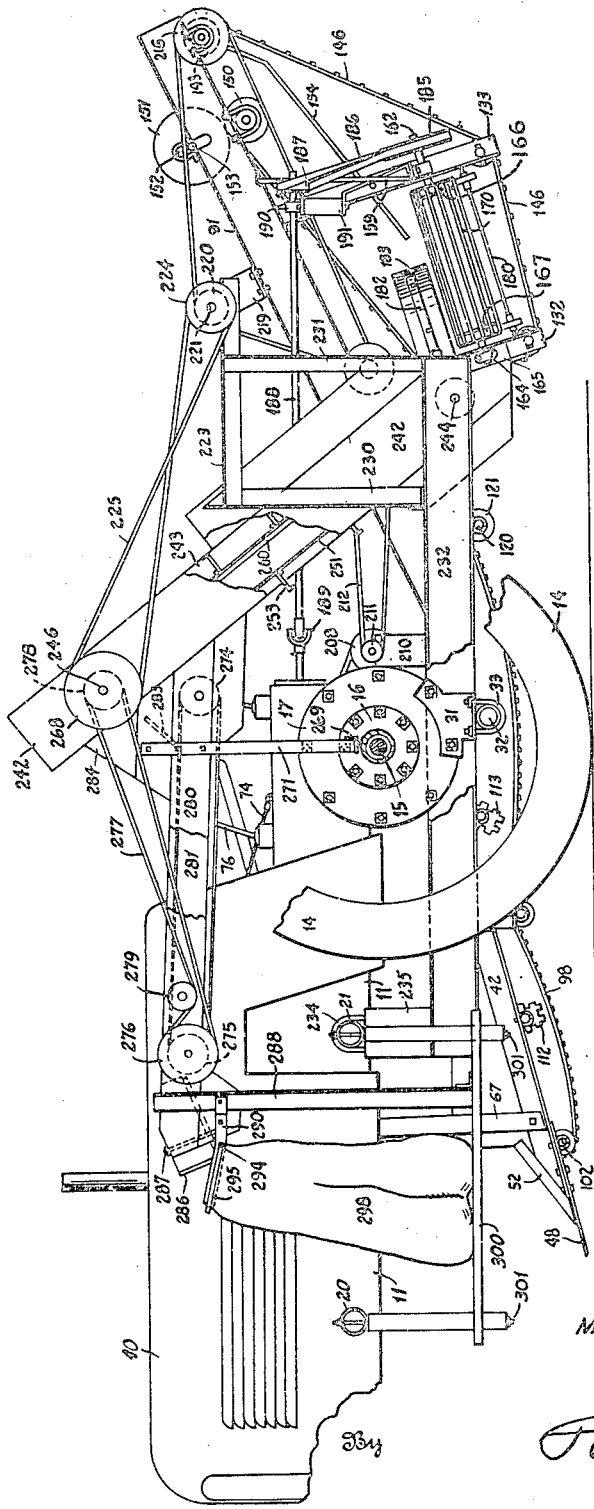
Figure 2 is a side elevation of the other side of the tractor from that shown in Figure 1 with most of the rear wheel of the tractor broken away.

Referring more specifically to the drawings, the numeral 10 represents the body portion of a suitable tractor having a base portion or frame portion 11 and conventional front wheels 12 and conventional rear wheels 13 and 14. In Figures 1 and 2 much of these rear wheels 13 and 14 are broken away in order to show the portions of the invention appearing therebehind. The rear wheels 13 and 14 are mounted on the ends of suitable splined axles 15 which are mounted in axle housings 16 extending from each side of a transmission housing 17.

The bed portion 11 of the tractor has fixedly mounted therein a pair of pipes 20 and 21 which extend laterally from each side thereof for supporting the potato digger and sacking mechanism. Mounted on the right hand side of the tractor and on top of these pipes 20 and 21 is a channel bar 22 by means of suitable U-bolts 23 and 24 which surround the pipes 20 and 21 and penetrate the angle bar 22 for holding it on top of the pipes 20 and 21.

Secured to the lower exterior portion of the axle housing 17 is a pair of brackets 30 and 31 in which a transverse pipe 32 is secured by means of suitable U-bolts 33 in the same manner on both sides as shown in Figure 2. Mounted on top of the pipe 32 are inner and outer horizontally and longitudinally disposed channel bars 34 and 35, these channel bars 34 and 35 being secured in position on top of pipe 32 by means of suitable U-bolts 36.

Near the front end of the frame, the channel bars 34 and 35 have suitable angle brackets 37 and 38 whose upper ends are secured to the lower surface of pipe 21 by means of U-bolts 39. Pivotally secured on the inner sides of the channel bars 34 and 35 are angle bars 41 and 42, these being pivoted to the channel bars 34 and 35 by means of suitable bolts 43. These angle bars 41 and 42 project forwardly and downwardly and have secured to the lower surface thereof at their forward ends the legs 46 and 47 of digger plate 48 which is pointed at its end for entering the ground and passing below the potatoes in a row. The digger 48 is shown in the drawings in partially elevated position.

Suitable sheet iron shield members 51 and 52 cover the front ends of the angle bars 41 and 42. The shield members also extend upwardly, outwardly, and downwardly and cover up the front ends of the angle bars 41 and 42 and are bolted through the horizontal portion of angle bars 41 and 42 as at 44 to hold them in position. These shield members 51 and 52 have vertically disposed portions 60 and 61 which direct the earth and potatoes onto the conveyor, to be presently described, after they have been loosened up by the digger 48. The members 51 and 52 are secured to the inner surface of the angle bars 41 and 42 by means of the bolts 43 and bolts 53.

Secured to the inner uprising angle of channel bar 22 and extending upwardly is a bar 63 which is slotted as at 64 and in which slot is adapted to have vertical movement a spacer pipe 65 which is disposed between lift bars 66 and 67 which are secured to the ends of the pipe by means of a bolt 68. This spacer pipe 65 has vertical movement in the slot 64 in the uprising bar 63.

The two bars 66 and 67 extend downwardly and are secured at their lower ends to the angle bars 41 and 42 by the bolts 53, whereby the depth of the cut of the digger 48 can be adjusted and whereby the digger 48 can be raised entirely out of the ground if desired. A hook 72 is secured around the spacer pipe 65. A cable 74 is secured to hook 72 and passes over a pulley 73 rotatably mounted on the upper end of bar 63 and cable 74 extends to an arm 71 of a hydraulic lift mechanism 75 which is controlled by lever 76, whereby the digger 48 can be raised or lowered.

Also, rotatably mounted around the spacer pipe 65 is an inverted U-shaped member 77 and between the lower free ends of same is rotatably mounted a roller 78 on a bolt 79 which penetrates the two legs of the inverted U-shaped member 77.

Also, penetrated by bolt 79 is a lever 80 which extends upwardly and rearwardly and has adjustably secured thereto a link 81 whose other end is fixed to the inverted U-shaped member 77 by means of a bolt 83. Mounted on the channel bar 22 is a member which has an arc portion 84 which is toothed on one edge and the lever 80 has a member 85 having a knife-edge adapted to engage the notches in the arc portion 84 to thus adjust the depth of cut of the knife 48 by the adjustment of the lever 80 relative to the arc segment 84.

Secured to the channel members 34 and 35 as by welding, at a point slightly rearwardly of and below the rear axle of the tractor is a pair of upwardly and rearwardly slanting channel bars 90 and 91. These bars have bearings 92 and 93 on their lower surfaces in which a shaft 94 is mounted for rotation. This shaft 94 has fixedly mounted thereon a pair of pulleys 95 and 96 on which are mounted the belts 97 and 98 of a conveyor chain for conveying the potatoes rearwardly after they have been dug. The front ends of these belts 97 and 98 are mounted on pulleys 100 and 101 which are mounted for rotation on a shaft 102 as shown in Figure 5.

All idler pulleys in this mechanism are of the same structure as shown in Figure 5 wherein a shaft such as 102 is secured to angle iron 41 or any other angle to which it is secured as shown throughout the drawings by means of a bolt 103 and this shaft is penetrated by bolts or pins 104 and 105, confining washers 106 and 107 thereon for idly confining the idler pulleys such as 100.

The conveyor belts 97 and 98 have secured thereon a plurality of rods 110, alternate of these rods being bent downwardly and other rods being bent upwardly to present an uneven effect to thus prevent the potatoes from rolling downwardly on the conveyor as they are conveyed rearwardly up the pivoted digger portion and also the rearward portion of this conveyor as it climbs upwardly along channel bars 90 and 91.

A portion of the rods adjacent the belts are not curved but serve to receive a suitable agitator sprocket on each side thereof such as indicated by reference characters 112 and 113. These agitator sprockets are rotatably mounted on suitable rods 114 and 115 which are secured to the lower edges of angles 41 and 42 and channel bars 34 and 35 in the same manner as shown in Figure 5.

The uneven shape of these sprocket wheels 112 and 113 causes up and down movement of the conveyor as it rotates the sprockets by engaging the same and thus assists in shaking the soil from the potatoes and causing the soil to fall through the conveyor while the potatoes are carried rearwardly by the conveyor. The idler pulleys for supporting the lower or returning portion of the conveyor also engage the uncurved ends of the rods 110 for supporting the conveyor on its return.

Adjacent the point where the upwardly slanting channel irons 90 and 91 are secured to the channel bars 34 and 35 is a pair of cone idler pulleys 117 and 118 which engage the belts 97 and 98 and hold the conveyor depressed at this point to keep it from defining a straight line from idler sprockets 112 and 113 to the pulleys 95 and 96. The upwardly and rearwardly inclined portion of the conveyor which is disposed between the channel bars 90 and 91 is a very valuable feature in that it obtains better separation between the soil and the potatoes when the digging is heavy and separation is difficult. By having this upwardly inclined portion for the conveyor, that portion of the soil which has not been broken up to fall through the spokes of the conveyor will have a tendency to roll down the inclined portion and, thus, will be completely broken up so that the soil will fall through the conveyor belt.

There is also secured on the lower surface of channel bars 34 and 35, in the same manner as shown in Figure 5, a rod 120 which has a pair of idler pulleys 121 thereon for supporting the lower or returning portions of the belts 97 and 98 and to prevent their dragging the ground.

There are also mounted on the lower surface of channel bars 34 and 35 suitable brackets 122 which extend downwardly and have a rod 123 secured thereto in the same manner as shown in Figure 5 on which other idler pulleys 124 are mounted for supporting the belts 97 and 98 and holding the returning portion of the conveyor off the ground.

Rigidly secured to, as by welding, and projecting downwardly and rearwardly from the channel 90 is a pair of angle bars 130 and 131, and similar bars 132 and 133 are secured at their upper ends to the channel bar 91, as by welding, and project downwardly and rearwardly.

Mounted in the angle bars 130 and 132 are two rods 134 and 135 on which is mounted a pair of idler pulleys 136 and 137, there being two idler pulleys 136 on rod 134 and two idler pulleys 137 on rod 135. These idler pulleys are mounted in the same manner as shown in Figure 5. There is also mounted a shaft or rod 138 between the angle bars 131 and 132 and a pair of idler pulleys 139 are mounted on this rod 138 in the same manner as shown in Figure 5.

In the extreme end, and on the lower surface thereof, of channel bars 90 and 91 is rotatably mounted a shaft 141 having fixed thereon a pair of pulleys 142 and 143, which shaft 141 is driven in a manner hereinafter to be described.

On the pulleys 136, 137, 139, 142, and 143 are mounted belts 145 and 146, which belts have a plurality of rods 147 disposed thereacross, which are about three times as far apart as the rods 110 on the first named conveyor comprising belts 97 and 98.

The conveyor comprising the belts 145 and 146 passes immediately above a roller 150 rotatably mounted between the channel bars 90 and 91. Resting on the conveyor comprising belts 145 and 146 is a roller 151 whose end portions have up and down movement in slots 152 in suitable bearings 153 secured on the upper surface of channel bars 90 and 91. These channel bars 90 and 91 also have the slots 152 extending down into the channel bars so that roller 151 can have up and down movement in these slots 152 and at all times press against the conveyor comprising belts 145 and 146.

As the first conveyor comprising belts 97 and 98 dumps the potatoes and potato tops off the rear end thereof, the potatoes will fall through the spokes or rods 147 of conveyor comprising belts 145 and 146 down onto the transverse conveyor to be presently described, but the potato tops will not fall through this conveyor and will be conveyed rearwardly where, as they pass between the rollers 150 and 151, the potatoes will be stripped from the tops while the tops will pass onwardly and rearwardly between the rollers 150 and 151 and be discharged out of the rear of the machine. The potatoes which are still adhering to the tops and being removed from the roots of the tops by the rollers 150 and 151 will fall downwardly and strike a plurality of spaced rods 154 forming a grill. These rods are loosely secured at one end around the shaft 141 and at their other ends they rest on a transverse shaft 155. This directs these falling potatoes downwardly onto the transverse conveyor to be presently described.

The rear end of the channel irons 34 and 35 are also fixedly secured by welding or otherwise to the downwardly and rearwardly projecting angle bars 131 and 132.

Fixedly secured to the downwardly and rearwardly projecting angle bar 133 is a substantially horizontally disposed angle bar 160 in the outer end of which is mounted a bearing 161 in which a shaft 162 is rotatably mounted, the other end of this shaft being mounted in a suitable bearing 164 secured in a downwardly depending angle bar 165. In these bearings 161 and 164 is rotatably mounted the shaft 162 which has affixed thereon a pair of pulleys 166 and 167 on which belts 168 and 169 are mounted. Bar 160 is supported by a strut 159 secured near the outer end of bar 160 and having its other end secured to channel bar 91.

The belts 168 and 169 have rods 170 disposed thereacross in the same manner as the other rods for the other conveyors as previously described except that they are straight and not bowed alternately up and down. The other end of the belt is rotatably mounted on idler pulleys 171 and 172 which are rotatably mounted on a shaft 173 whose ends are secured by bolts 174 in the downwardly projecting angle bars 130 and 131. There are also disposed between the ends of the first-named conveyor one or more idler mechanisms such as a rod 175 being bolted at the rear end to horizontal angle 160, the forward end being bolted to vertical angle 132. Mounted on rod 175 are idler pulleys 176 and 177, the structure of this rod 175 and pulleys 176 and 177 being substantially the same as shown in detail in Figure 5.

The lower or returning portion of the transverse conveyor is also supported by suitable idler pulleys 178 and 179 disposed on shafts 180 which prevents the lower leaf of the endless conveyor from sagging downwardly too far. Adjacent the front or lowermost leg of the transverse conveyor is disposed a plate 181 which prevents the potatoes from rolling forwardly off the front edge of the conveyor as it is to be noted that this conveyor is slightly tilted between fifteen and twenty degrees so as to cause the potatoes to roll forwardly towards the front of the tractor; whereas, clods, stones, and uneven objects will not roll forwardly but will be discharged off of the end of the conveyor on the left hand side of the tractor as it progresses forwardly. The metal plate 181 is cut away when it reaches the elevating conveyor, to be presently described, so that the potatoes can fall into the elevating conveyor.

Secured to the outer wall 242 of the elevating conveyor, to be later described, is a bracket 182 which has a sheet of material 183, such as belting, which directs the potatoes from the transverse conveyor onto the elevating conveyor.

The transverse conveyor just described is driven by means of the shaft 162 having a pulley 185 thereon on which is mounted a belt 186, which is also mounted on a pulley 187 on the rear end of a shaft 188 which is connected to one of the suitable power take-offs 192 of the tractor, controlled by a lever 193. This shaft 188 has a conventional universal joint 189 therein.

The rear end of the shaft 188 is supported by means of a bearing 190 disposed on a bracket 191 whose lower end is mounted on the horizontally extending bar 160.

The tractor also has another suitable power take-off 200, controlled by a lever 199, and having a pulley 201 thereon which in the present type rotates in a counterclockwise manner thus requiring idler pulleys in order to drive the mechanism in the right direction. This comprises an uprising bar 202 having its lower end secured to the channel bar 22 and being provided with a pair of idler pulleys 203 and 204 over which a belt 205 passes. This arrangement causes the belt 205 to remain in contact with the pulley 201 whereby movement is imparted to the belt.

Figure 3:
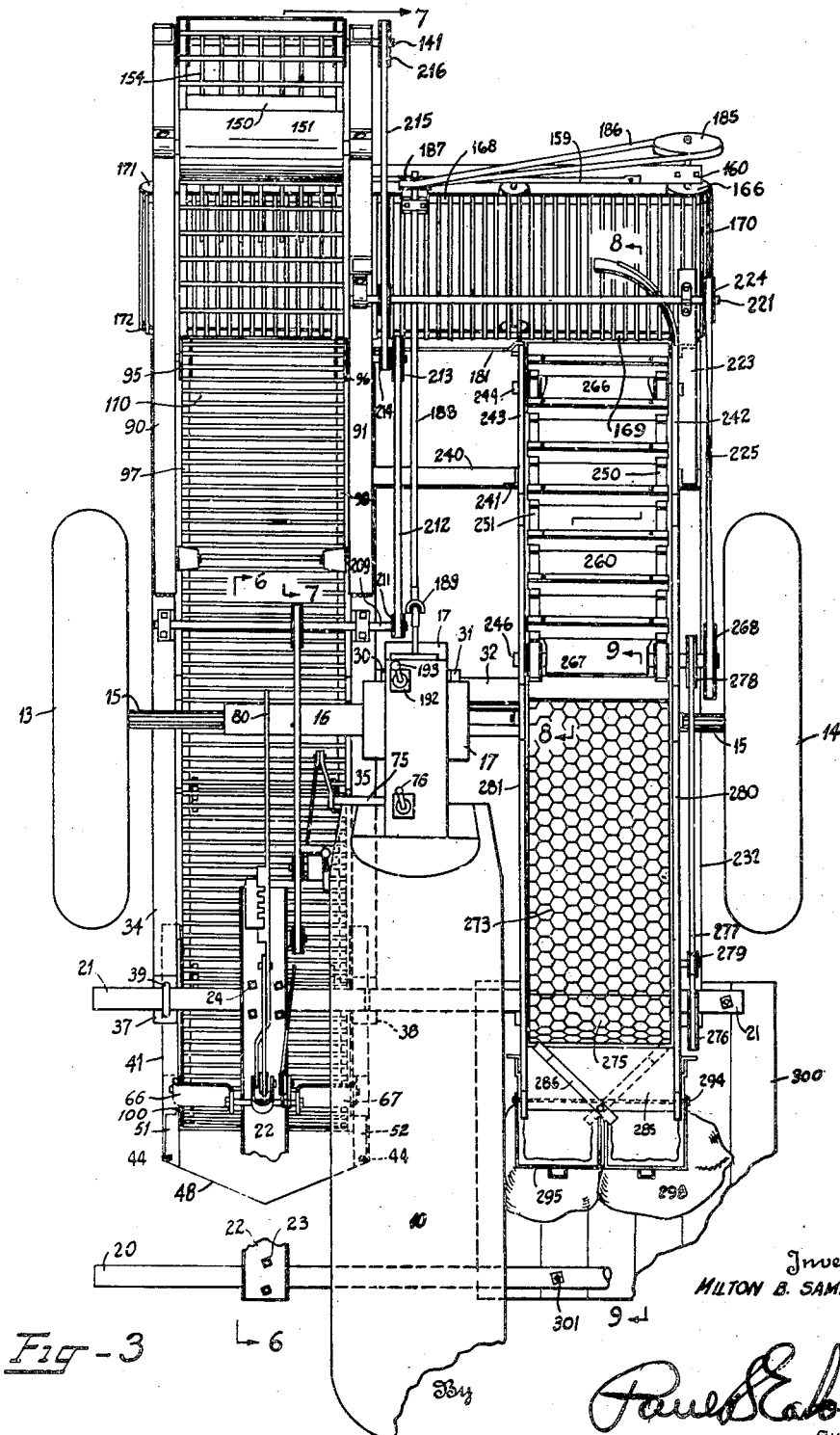
Figure 3 is a top plan view of the tractor showing my complete apparatus associated therewith.

The belt 205 is also mounted on a pulley 208 which is fixed on a transverse shaft 209 disposed in bearing brackets 210 mounted on the upper surfaces of the channel bars 34 and 35. This shaft 209 extends to the right in Figure 3 or towards the tractor and has a pulley 211 thereon on which a belt 212 is mounted, which belt is also mounted on a pulley 213 fixed on the shaft 94 which imparts rotation to the first conveyor chain which conveys the potatoes from the time they are dug, back to the point of dumping onto the top-separating conveyor.

The shaft 94 also has mounted thereon a smaller pulley 214 which has a belt 215 mounted thereon which is also mounted on a pulley 216 fixed on shaft 141 which thus drives the top-separating conveyor. The belt 215 also contacts a pulley 220 mounted on a shaft 221, which is mounted at one end in a bearing 222 on a bracket 219 secured on top of the sloping channel bar 91, and mounted at its other end on a suitable angle iron 223, and having a pulley 224 thereon on which a belt 225 is mounted for driving the elevating conveyor to be presently described.

The angle bar 223 is supported by other angle bars 230 and 231 which rise upwardly from a channel bar 232 which is supported on the left hand side of the tractor by resting on pipe 32 and having a U-bolt 33 around the pipe and penetrating the flange of the channel bar 232. The front end of this channel bar 232 is supported by having a bracket 235 secured to the upper surface thereof and also secured by means of a suitable U-bolt 234 which passes around the pipe 21 and penetrates a flange of the bracket 235.

Secured to the channel bar 232 and to the channel bar 35 is a transverse angle bar 240 to which the vertical angle bar 230, previously described, is secured by welding or otherwise at its lower end and also a vertical bar 241 rises up from this angle bar 240 and these bars 230 and 241 support the side walls 242 and 243 of an elevating conveyor. This elevating conveyor has an idler shaft 244 near its lower end on which two pulleys 245ª are mounted, and near the upper end between the side walls 242 and 243 is a shaft 246 on which pulleys 248 are mounted, and on the pulleys 248 and the lower pulleys 245ª are mounted belts 250 and 251 which have secured thereacross a plurality of paddles 253 which have a wiping edge 254, of material such as leather, secured at their outer edges. Instead of V-belts 250 and 251, I may use sprocket chains such as indicated at 252 with occasional links having fins 255 projecting therefrom to which the paddles 253 may be secured by bolts 256. This conveyor has immediately below the uppermost portion thereof a partition or bottom member 260 on which the belts run, and this prevents the potatoes from falling between the belts and causes the paddles on the belts to raise the potatoes upwardly when they fall thereinto at the lower end from the transverse conveyor comprising belts 168 and 169.

As will be seen in Figure 8, there is suitably secured between the side walls 242 and 243 a sheet metal member 265 onto which the potatoes fall from the transverse conveyor and are scooped up by the paddles of the elevating conveyor. The false bottom member 260 also has another sheet metal member 266 secured thereto and curving around the idler shaft 244 to prevent the potatoes from falling through the conveyor mechanism. The upper end of the bottom 260 of the conveyor has a sheet metal portion 267 which surrounds the driven shaft 246 and prevents the potatoes from falling down around the shaft but causes them to fall onto the next conveyor to be described.

The driven shaft 246 has a pulley 268 thereon on which a belt 225 is mounted which belt is also mounted on the pulley 224 on the transverse shaft 221 which imparts motion to the elevating conveyor. The front end of this elevating conveyor has secured thereto the side walls 280 and 281 of a horizontal meshed conveyor 273 which is made of suitable woven wire which conveys the potatoes outwardly to where they will be sacked. The rear portion of the horizontal conveyor and the front portion of the elevating conveyor are supported by vertical members 271 and 272, welded at their base to a transverse angle 269 mounted on axle housing 16 by welding or other means. This horizontally disposed conveyor 273 is mounted on a suitable roller 274 at one end and a driven roller 275 at its other end which is driven by means of a pulley 276 and a belt 277 which belt is also fixed on a pulley 278 on shaft 246. A suitable idler pulley 279 cooperates with the belt 277.

The side walls of this horizontal conveyor are indicated by 280 and 281. As the potatoes fall from the elevating conveyor onto the horizontal conveyor they strike also a board 283 which prevents their falling back down between the rear end of the horizontal conveyor and elevating conveyor.

Also suitable sheet metal members 284 are disposed on each side of the horizontal conveyor and joined to the side walls of the elevating conveyor to prevent the potatoes from bouncing out of the horizontal conveyor. The potatoes are discharged off of the horizontal conveyor onto a sloping board 285 which has a pivoted board 286 thereon which is pivoted on uprising bolt 287.

Secured to the front end of this horizontal conveyor are upright angle members 288 and 289 which support the front end of this horizontal conveyor. Secured to these angles 288 and 288 are U-shaped members 290 which have downwardly and rearwardly projecting hooks 291, a pair of such hooks being at the rear portion of each of the U-shaped members 290, and each U-shaped member has pivoted thereto as at 294 a U-shaped member 295 which is adapted to pivot down and rest against a projection 296 on the front end of each of the U-shaped members 290 so as to frictionally hold the open end of a sack 298 between the pivoted U-shaped member and the fixed U-shaped member after its front edges have been hooked over the hooks. These sacks are adapted to rest on a suitable platform 300 which is supported by suitable bolts 301 suspended from the pipes 20 and 21.

In the drawings and specification there has has been set forth a preferred embodiment of the invention, and although specific terms are employed, they are used in a generic and descriptive sense only, and not for purposes of limitation, the scope of the invention being defined in the claims:

I claim:

1. A potato digger adapted to be mounted on a power driven wheeled frame, commonly referred to as a tractor, comprising a longitudinally extending framework disposed on one side of the tractor, a pivoted digger mounted on the front end of the framework and means for lowering and raising the pivoted digger into and out of the ground, said framework extending rearwardly of the rear wheels of the tractor and having its rear end slanting upwardly, an endless conveyor having its front end mounted in the front end of the pivoted digger and its rear end mounted in the rear end of the upwardly slanting portion of the framework, means driven by the tractor for imparting movement to the conveyor to convey the potatoes rearwardly of the tractor and upwardly on the inclined rear portion of the framework, a transversely disposed endless conveyor disposed behind the tractor and onto which the potatoes are adapted to fall from the rear end of the first conveyor, said transverse conveyor having its front edge at a lower elevation than its rear edge whereby the potatoes will roll downwardly towards the front edge of the transverse conveyor while clods and other foreign matter will not roll forwardly on the conveyor but will be discharged from the discharge end of the conveyor, and means connected to the power takeoff means of the tractor for driving the conveyors.

2. A potato digger adapted to be mounted on a power driven wheeled frame, commonly referred to as a tractor, comprising a longitudinally extending framework disposed on one side of the tractor, a pivoted digger mounted on the front end of the framework and means for lowering and raising the pivoted digger into and out of the ground, said framework extending rearwardly of the rear wheels of the tractor and having its rear end slanting upwardly, an endless conveyor having its front end mounted in the front end of the pivoted digger and its rear end mounted in the rear end of the upwardly slanting portion of the framework, means driven by the tractor for imparting movement to the conveyor to convey the potatoes rearwardly of the tractor and upwardly on the inclined rear portion of the framework, a transversely disposed endless conveyor disposed behind the tractor and onto which the potatoes are adapted to fall from the rear end of the first conveyor, said transverse conveyor having its front edge at a lower elevation than its rear edge whereby the potatoes will roll downwardly towards the front edge of the transverse conveyor while clods and other foreign matter will not roll forwardly on the conveyor but will be discharged from the discharge end of the conveyor, an upwardly and forwardly projecting conveyor disposed on the other side of the tractor and into which the potatoes are adapted to fall from the transverse conveyor for elevating the potatoes, a fourth conveyor disposed below the upper end of the upwardly and forwardly projecting conveyor for receiving the potatoes and moving them forwardly of the tractor, means associated with the front end of the conveyor for holding a plurality of containers and pivoted gate means for selectively directing the potatoes into any one of the containers, and means connected to the power takeoff means of the tractor for driving the conveyors.

3. A potato digger adapted to be mounted on a power driven wheeled frame, commonly referred to as a tractor, comprising a longitudinally extending framework disposed on one side of the tractor, a pivoted digger mounted on the front end of the framework and a power take-off on the tractor for lowering and raising the pivoted digger into and out of the ground, said framework extending rearwardly of the rear wheels of the tractor and having its rear end slanting upwardly, an endless conveyor having its front end mounted in the front end of the pivoted digger and its rear end mounted in the rear end of the upwardly slanting portion of the framework, a second power take-off on the tractor for imparting movement to the conveyor to convey the potatoes rearwardly of the tractor and upwardly on the inclined rear portion of the framework, a transversely disposed endless conveyor disposed behind the tractor and onto which the potatoes are adapted to fall from the rear end of the first conveyor, said transverse conveyor having its front edge at a lower elevation than its rear edge whereby the potatoes will roll downwardly towards the front edge of the transverse conveyor while clods and other foreign matter will not roll forwardly on the conveyor but will be discharged from the discharge end of the conveyor, a third power take-off on the tractor for driving the transverse conveyor.

4. A potato digger adapted to be mounted on a power driven wheeled frame, commonly referred to as a tractor, comprising a longitudinally extending framework disposed on one side of the tractor, a pivoted digger mounted on the front end of the framework and means for lowering and raising the pivoted digger into and out of the ground, said framework extending rearwardly of the rear wheels of the tractor and having its rear end slanting upwardly, an endless conveyor having its front end mounted in the front end of the pivoted digger and its rear end mounted in the rear end of the upwardly slanting portion of the framework, a transversely disposed endless conveyor disposed behind the tractor and having one end disposed below the first conveyor and onto which the potatoes are adapted to fall from the rear end of the first conveyor, said transverse conveyor having its front edge at a lower elevation than its rear edge whereby the potatoes will roll downwardly towards the front edge of the transverse conveyor while clods and other foreign matter will not roll forwardly on the conveyor but will be discharged from the discharge end of the conveyor, a coarse-meshed endless conveyor disposed below the rear end of the first conveyor and above the second conveyor for permitting potatoes to fall through the same but retaining the potato tops and other vegetation and discharging it to the rear of the second conveyor, and a pair of rollers between which the coarse meshed conveyor passes to strip the tops from any potatoes which may be still adhering to the tops, means disposed below the rollers and onto which the separated potatoes may fall for directing such separated potatoes onto the transverse conveyor, and means connected to the power takeoff means of the tractor for driving the conveyors.

5. A potato digger adapted to be mounted on a power driven wheeled frame, commonly referred to as a tractor, comprising a longitudinally extending framework disposed on one side of the tractor, a pivoted digger mounted on the front end of the framework and means for lowering and raising the pivoted digger into and out of the ground, said framework extending rearwardly of the rear wheels of the tractor and having its rear end slanting upwardly, an endless conveyor having its front end mounted in the front end of the pivoted digger and its rear end mounted in the rear end of the upwardly slanting portion of the framework, a transversely disposed endless conveyor disposed behind the tractor and onto which the potatoes are adapted to fall from the rear end of the first conveyor, said transverse conveyor having its front edge at a lower elevation than its rear edge whereby the potatoes will roll downwardly towards the front edge of the transverse conveyor while clods and other foreign matter will not roll forwardly on the conveyor but will be discharged from the discharge end of the conveyor, an upwardly and forwardly projecting conveyor disposed on the other side of the tractor and into which the potatoes are adapted to fall from the transverse conveyor for elevating the potatoes, a fourth conveyor disposed below the upper end of the upwardly and forwardly projecting conveyor for receiving the potatoes and moving them forwardly of the tractor, means associated with the front end of the conveyor for holding a plurality of containers and pivoted gate means for selectively directing the potatoes into any one of the containers, a coarse-meshed endless conveyor disposed below the rear end of the first conveyor and above the second conveyor for permitting potatoes to fall through the same but retaining the potato tops and other vegetation and discharging it to the rear of the second conveyor, and a pair of rollers between which the coarse-meshed conveyor passes to strip any potatoes which may be still adhering to the tops, means disposed below the rollers onto which the separated potatoes may fall for directing such separated potatoes onto the transverse conveyor, and means connected to the power takeoff means of the tractor for driving the conveyors.

6. A potato digger adapted to be mounted on a power driven wheeled frame, commonly referred to as a tractor, comprising a longitudinally extending framework disposed on one side of the tractor, a pivoted digger mounted on the front end of the framework and means for lowering and raising the pivoted digger into and out of the ground, said framework extending rearwardly of the rear wheels of the tractor and having its rear end slanting upwardly, an endless conveyor having its front end mounted in the front end of the pivoted digger and its rear end mounted in the rear end of the upwardly slanting portion of the framework, means driven by the tractor for imparting movement to the conveyor to convey the potatoes rearwardly of the tractor and upwardly on the inclined rear portion of the framework, a transversely disposed endless conveyor disposed behind the tractor and onto which the potatoes are adapted to fall from the rear end of the first conveyor, said transverse conveyor having its front edge at a lower elevation than its rear edge whereby the potatoes will roll downwardly towards the front edge of the transverse conveyor while clods and other foreign matter will not roll forwardly on the conveyor but will be discharged from the discharge end of the conveyor, both of said conveyors being perforated to allow dirt to fall therethrough but preventing the potatoes from falling through the conveyors, a coarse-meshed endless conveyor disposed below the rear end of the first conveyor and above the second conveyor for permitting potatoes to fall through the same but retaining the potatoes' tops and other vegetation and discharging the same to the rear of the second conveyor, a pair of rollers between which the coarse-meshed conveyor passes to separate the tops and vegetation from any potatoes which may be still adhering to the tops, means disposed below the rollers onto which the separated potatoes may fall for directing such separated potatoes onto the transverse conveyor, and means connected to the power takeoff means of the tractor for driving the conveyors.

7. A potato digger adapted to be mounted on a power driven wheeled frame, commonly referred to as a tractor, comprising a longitudinally extending framework disposed on one side of the tractor, a pivoted digger mounted on the front end of the framework and means for lowering and raising the pivoted digger into and out of the ground, said framework extending rearwardly of the rear wheels of the tractor and having its front end mounted in the front end of the pivoted digger and its rear end mounted in the rear end of the upwardly slanting portion of the framework, means driven by the tractor for imparting movement to the conveyor to convey the potatoes rearwardly of the tractor and upwardly on the inclined rear portion of the framework, a transversely disposed endless conveyor disposed behind the tractor and onto which the potatoes are adapted to fall from the rear end of the first conveyor, said transverse conveyor having its front edge at a lower elevation than its rear edge whereby the potatoes will roll downwardly towards the front edge of the transverse conveyor while clods and other foreign matter will not roll forwardly on the conveyor but will be discharged from the discharge end of the conveyor, an upwardly and forwardly projecting conveyor disposed on the other side of the tractor and into which the potatoes are adapted to fall from the transverse conveyor for elevating the potatoes, a fourth conveyor disposed below the upper end of the upwardly and forwardly projecting conveyor for receiving the potatoes and moving them forwardly of the tractor, means associated with the front end of the conveyor for holding a plurality of containers and pivoted gate means for selectively directing the potatoes into any one of the containers, all of said conveyors being perforated to allow dirt and other foreign matter to fall therethrough but preventing the potatoes from falling therethrough, a coarse-meshed endless conveyor disposed below the rear end of the first conveyor and above the second conveyor for permitting potatoes to fall through the same but retaining the potato tops and other vegetation and discharging the same to the rear of the second conveyor, a pair of rollers between which the coarse meshed conveyor passes to separate the potatoes from any tops to which some of the potatoes may still be adhering so that the thusly separated potatoes may fall through the coarse meshed conveyor and the tops will pass between the pair of rollers, means disposed below the rollers for directing such separated potatoes onto the transverse conveyor, and means connected to the power takeoff means of the tractor for driving the conveyors.

8. In a potato digger and sacker, a tractor, a pair of spaced bars disposed in horizontal relation on one side of the tractor, a pair of bars having one end pivotally secured to the front end of the spaced bars, a digger mounted on the other end of the pair of pivoted bars, a pair of upwardly and rearwardly directed bars secured to the rear portion of the spaced bars and having a shaft with a pair of pulleys thereon, a shaft having a pair of pulleys thereon and mounted in close proximity to the digger, an endless conveyor mounted on the pulleys on the two shafts, said conveyor having transverse spaced rods whereby potatoes and earth excavated by the digger will be conveyed rearwardly and the earth separated from the potatoes, a plurality of rotatably mounted sprocket wheels of uneven contour supporting the conveyor on its rearward movement for raising and lowering the conveyor to impart vibrations thereto to assist in separating the earth from the potatoes, means disposed adjacent the lower ends of the upwardly and rearwardly extending bars which are adapted to engage the top of the conveyor for depressing the conveyor as it ascends the rearwardly and upwardly extending bars, and means driven by the tractor for imparting movement to the conveyor.

9. In a potato digger and sacker, a tractor, a pair of spaced bars disposed in horizontal relation on one side of the tractor, a pair of bars having one end pivotally secured to the front end of the spaced bars, a digger mounted on the other ends of the pair of pivoted bars, a pair of upwardly and rearwardly directed bars secured to the rear portion of the spaced bars and having a shaft with a pair of pulleys thereon, a shaft having a pair of pulleys thereon and mounted in close proximity to the digger, an endless conveyor mounted on the pulleys on the two shafts, said conveyor having transverse spaced rods whereby potatoes and earth excavated by the digger will be conveyed rearwardly and the earth separated from the potatoes, a plurality of rotatably mounted sprocket wheels of uneven contour supporting the conveyor on its rearward movement for raising and lowering the conveyor to impart vibrations thereto to assist in separating the earth from the potatoes, means disposed adjacent the lower ends of the upwardly and rearwardly extending bars which are adapted to engage the top of the conveyor for depressing the conveyor as it ascends the rearwardly and upwardly extending bars, means disposed to the rear of and below the rear end of the conveyor for receiving the potatoes and the potato tops and separating the potatoes from the top, and discharging the tops onto the ground, means for conveying the potatoes laterally of and behind the tractor, driving means connected to the conveyor and said driving means also being connected to the means for conveying the potatoes laterally.

10. In a potato digger and sacker, a tractor, a pair of spaced bars disposed in horizontal relation on one side of the tractor, a pair of bars having one end pivotally secured to the front end of the spaced bars, a digger mounted on the other end of the pair of pivoted bars, a pair of upwardly and rearwardly directed bars secured to the rear portion of the spaced bars and having a shaft with a pair of pulleys thereon, a shaft having a pair of pulleys thereon and mounted in close proximity to the digger, an endless conveyor mounted on the pulleys on the two shafts, said conveyor having transverse spaced rods whereby potatoes and earth excavated by the digger will be conveyed rearwardly and the earth separated from the potatoes, a plurality of rotatably mounted sprocket wheels of uneven contour supporting the conveyor on its rearward movement for raising and lowering the conveyor to impart vibrations thereto to assist in separating the earth from the potatoes, means disposed adjacent the lower ends of the upwardly and rearwardly extending bars which are adapted to engage the top of the conveyor for depressing the conveyor as it ascends the rearwardly and upwardly extending bars, means disposed to the rear of and below the rear end of the conveyor for receiving the potatoes and the potato tops and separating the potatoes from the potato tops, and discharging the tops onto the ground, means for conveying the potatoes laterally of and behind the tractor, an elevating conveyor disposed on the other side of the tractor from the first conveyor, means for directing the potatoes from the transverse conveyor into the elevating conveyor, sacking means for receiving the potatoes from the elevating conveyor, and means connecting the tractor to all of the conveyors for imparting movement to the same.

11. In a potato digger and sacker, a tractor, a pair of spaced bars disposed in horizontal relation on one side of the tractor, a pair of bars having one end pivotally secured to the front end of the spaced bars, a digger mounted on the other end of the pair of pivoted bars, a pair of upwardly and rearwardly directed bars secured to the rear portion of the spaced bars and having a shaft with a pair of pulleys thereon, a shaft having a pair of pulleys thereon and mounted in close proximity to the digger, an endless conveyor mounted on the pulleys on the two shafts, said conveyor having transverse spaced rods whereby potatoes and earth excavated by the digger will be conveyed rearwardly and the earth separated from the potatoes, a plurality of rotatably mounted sprocket wheels of uneven contour supporting the conveyor on its rearward movement for raising and lowering the conveyor to impart vibrations thereto to assist in separating the earth from the potatoes, means disposed adjacent the lower ends of the upwardly and rearwardly extending bars which are adapted to engage the top of the conveyor for depressing the conveyor as it ascends the rearwardly and upwardly extending bars, means driven by the tractor for imparting movement to the conveyor, said tractor having a hydraulic mechanism, means connecting the two pivoted bars to the hydraulic mechanism for lifting the digger, and means connected to the two pivoted bars for regulating the depth of cut of the digger.

12. In a potato digger and sacker, a tractor, a pair of spaced bars disposed in horizontal relation on one side of the tractor, a pair of bars having one end pivotally secured to the front end of the spaced bars, a digger mounted on the other end of the pair of pivoted bars, a pair of upwardly and rearwardly directed bars secured to the rear portion of the spaced bars and having a shaft with a pair of pulleys thereon, a shaft having a pair of pulleys thereon and mounted in close proximity to the digger, an endless conveyor mounted on the pulleys on the two shafts, said conveyor having transverse spaced rods whereby potatoes and earth excavated by the digger will be conveyed rearwardly and the earth separated from the potatoes, a plurality of rotatably mounted sprocket wheels of uneven contour supporting the conveyor on its rearward movement for raising and lowering the conveyor to impart vibrations thereto to assist in separating the earth from the potatoes, means disposed adjacent the lower ends of the upwardly and rearwardly extending bars which are adapted to engage the top of the conveyor for depressing the conveyor as it ascends the rearwardly and upwardly extending bars, means disposed to the rear of and below the rear end of the conveyor for receiving the potatoes and the potato tops and separating the potatoes from the tops, and discharging the tops onto the ground, means for conveying the potatoes laterally of and behind the tractor, driving means connected to the conveyor and said driving means also being connected to the means for conveying the potatoes laterally, said tractor having a hydraulic mechanism, means connecting the two pivoted bars to the hydraulic mechanism for lifting the digger, and means connected to the two pivoted bars for regulating the depth of cut of the digger.

13. In a potato digger and sacker, a tractor, a pair of spaced bars disposed in horizontal relation on one side of the tractor, a pair of bars having one end pivotally secured to the front end of the spaced bars, a digger mounted on the other end of the pair of pivoted bars, a pair of upwardly and rearwardly directed bars secured to the rear portion of the spaced bars and having a shaft with a pair of pulleys thereon, a shaft having a pair of pulleys thereon and mounted in close proximity to the digger, an endless conveyor mounted on the pulleys on the two shafts, said conveyor having transverse spaced rods whereby potatoes and earth excavated by the digger will be conveyed rearwardly and the earth separated from the potatoes, a plurality of rotatably mounted sprocket wheels of uneven contour supporting the conveyor on its rearward movement for raising and lowering the conveyor to impart vibrations thereto to assist in separating the earth from the potatoes, means disposed adjacent the lower ends of the upwardly and rearwardly extending bars which are adapted to engage the top of the conveyor for depressing the conveyor as it ascends the rearwardly and upwardly extending bars, means disposed to the rear of and below the rear end of the conveyor for receiving the potatoes and the potato tops and separating the potatoes from the tops, and discharging the tops onto the ground, means for conveying the potatoes laterally of and behind the tractor, an elevating conveyor disposed on the other side of the tractor from the first conveyor, means for directing the potatoes from the transverse conveyor into the elevating conveyor, sacking means for receiving the potatoes from the elevating conveyor, means connecting the tractor to all of the conveyors for imparting movement to the same, said tractor having a hydraulic mechanism, means connecting the two pivoted bars to the hydraulic mechanism for lifting the digger, and means connected to the two pivoted bars for regulating the depth of cut of the digger.

MILTON B. SAMPLE.

REFERENCES CITED

The following references are of record in the file of this patent:

UNITED STATES PATENTS

| Number | Name | Date |
| --- | --- | --- |
| 1,008,534 | Fritz | Nov. 14, 1911 |
| 1,592,962 | Sample | July 20, 1926 |
| 1,715,218 | Wright | May 28, 1929 |
| 1,921,190 | Johnson | Aug. 8, 1933 |
| 2,015,549 | Dwyer | Sept. 24, 1935 |
| 2,027,840 | Rodin | Jan. 14, 1936 |
| 2,215,516 | Schooler | Sept. 24, 1940 |

FOREIGN PATENTS

| Number | Country | Date |
| --- | --- | --- |
| 52,758 | Austria | Mar. 26, 1912 |